Nov. 1, 1949

A. ROTH 2,486,881

VERTICALLY ADJUSTABLE ATTACHMENT
FOR BIFOCAL SPECTACLES
Filed May 19, 1947

INVENTOR.
AARON ROTH
BY

Patented Nov. 1, 1949

2,486,881

UNITED STATES PATENT OFFICE 2,486,881

VERTICALLY ADJUSTABLE ATTACHMENT FOR BIFOCAL SPECTACLES

Aaron Roth, Brooklyn, N. Y.

Application May 19, 1947, Serial No. 748,881

1 Claim. (Cl. 88—49)

The present invention relates to improvements in attachments for spectacles, one object of the invention being the provision of a separate device carrying nose engaging pads that can be detachably connected to the bridge of a pair of spectacles.

Another object of the present invention is the provision of an attachment for spectacles, or more particularly the plural focal types, by means of which the lens may be raised or lowered to bring the desired part of the lens into proper and comfortable alignment with the eye, and not necessitate the tilting rearwardly of the head when the lower focal part of the lens is to be used.

In order that the invention may be fully understood and its numerous advantages appreciated, attention is invited to the accompanying drawings, in which—

Figure 1:
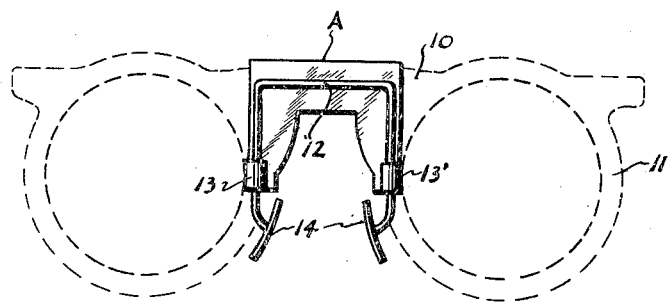
Figure 1 is a front view of the device as attached to a pair of spectacles, which latter is shown in dotted lines.
Figure 2:
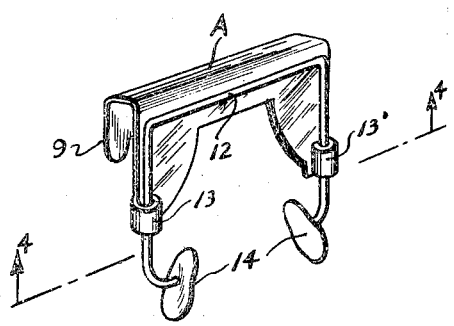
Figure 2 is a perspective view of the attachment per se.
Figure 3:
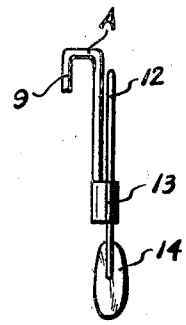
Figure 3 is an end view of the attachment, taken from the left side as viewed in Fig. 2.
Figure 4:
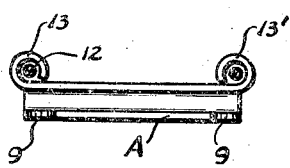
Figure 4 is a section taken on line 4—4 of Fig. 2.

Referring to the drawings, the numeral 10 designates the bridge of a pair of spectacles 11, preferably of the plastic type. Adapted to be detachably connected to or clamped upon the bridge thereof, is a clamp A, having a bent over spring portion 9 formed with two fingers, to form a gripping channel to fit over and clamp the attachment upon a bridge 10 of plural focal spectacle 11, dotted lines. In this instance, a U-shaped wire 12 is attached slidably in the tubes 13—13' which may be secured by soldering to the rear face of the plate 9. Attached to and carried by the extreme terminals of the wire 12 are the nose engaging pads 14. The friction between these terminals with their respective tubes 13—13' is such that the U-shaped wire will be held relatively firmly in place so that the desired lens segment of the spectacles will be positioned at the selected elevation and not readily moved out of place unless by choice of the user, thus making this attachment useful for professional persons and skilled artisans requiring frequent changes for near vision in different positions of the visual line at the same time providing a selection for distant vision by simple manipulation to change the position of the lenses vertically before the eyes.

From the foregoing description it will be evident that there has been provided a clamp or clip device that can be sold as an adjunct to plural focal spectacles, and which is easily and quickly attached to or detached from the bridge thereof.

What is claimed is:

A nose pad attachment for a spectacle comprising a clamp, said clamp having a channel to fit over the bridge of the spectacle, a spring finger at each end of the channel for engaging one side of the spectacle frame, two bearing legs on the other edge of the channel opposite the spring fingers for the engagement with the other side of the spectacle frame, a friction socket on the end of each leg, a U-shaped wire having its legs mounted in the socket, nose engaging pads carried on the terminals of the U-shaped member and the bottom of the U-shaped member comprising means by which the U-shaped member may be engaged in the sockets.

AARON ROTH.

REFERENCES CITED

The following references are of record in the file of this patent:

UNITED STATES PATENTS

| Number | Name | Date |
|---|---|---|
| Re. 20,322 | Page | Apr. 6, 1937 |
| 600,496 | Meyrowitz | Mar. 8, 1898 |
| 2,057,287 | Bailey | Oct. 13, 1936 |
| 2,057,288 | Bailey | Oct. 13, 1936 |
| 2,326,787 | Lorig | Aug. 17, 1943 |
| 2,446,725 | Seguin | Aug. 10, 1948 |